United States Patent Office 2,812,360
Patented Nov. 5, 1957

2,812,360

PROCESS FOR STABILIZING POLYGLYCOL COMPOUNDS

Edward J. Mills, Jr., and William J. Tapp, Charleston, W. Va., assignors to Union Carbide Corporation, a corporation of New York No Drawing. Application November 4, 1955, Serial No. 545,113

5 Claims. (Cl. 260—616)

The instant invention relates to a process for stabilizing polyglycol compounds.

As commercially made, polyglycol compounds contain acetal impurities. Upon storage in the presence of air, these impurities hydrolyze and are oxidized to form acids, and eventually to auto-catalyze the oxidization reaction. Accordingly, if this continuous action is not arrested rapidly, severe degradation of the polyglycols can occur upon storage for relatively short periods of time.

With a view to preventing such contamination, the primary object of the present invention is to provide a method whereby the acetal contained in polyglycol compounds is hydrolyzed to an aldehyde in which form it is subsequently removed.

A further object of the invention is to provide highly refined polyglycol compounds which remain stable for long periods of storage without addition of oxidation inhibitors.

In accordance with the method of the invention, hydrolysis of the acetal may be effected in any one of several ways. In one variant of the invention, hydrolysis is obtained by using dilute aqueous sulfuric acid, removing the aldehyde as a volatile product, and neutralizing. In another modification, the aqueous solution of polyethylene glycol is passed over an acidic ion-exchange resin. It is understood, however, that the hydrolysis process is not limited to these methods as other hydrolytic methods will readily suggest themselves to those skilled in the art. Conducive to a clearer understanding of the invention, it may be noted at this point that in general all of the strongly acidic substances which are known to catalyze the hydrolysis of acetals are operative for the purposes of the present process.

The following are submitted as examples of the successful practice of the invention.

EXAMPLE I

Six thousand grams of polyethylene glycol having a viscosity of 814 centistokes at 210° F., 4500 ml. of water, and 1000 ml. of 0.5 N. sulfuric acid solution were placed in a 12 liter flask equipped with a thermometer well and a goose-neck vapor line leading directly to a distillation apparatus suited for downward condensation. The mixture was heated to boiling and distillation continued until 1000 ml. of distillate was collected. After cooling, 1000 ml. of 0.5 N. sodium hydroxide solution was introduced into the reaction mixture. The mixture was again heated to boiling and distillation allowed to proceed until the reaction flask temperature reached 115° C. The vapor line was replaced by total reflux decanter similar to a Barrett water decanter, and 1000 ml. of benzene introduced into the flask. The mixture was maintained at total reflux and water removed at intervals from the decanter until substantially all of it had been eliminated. After a brief cooling period, the hot benzene solution was filtered on a suction filter using a filter aid to insure complete removal of suspended inorganic salts. The filtrate thus obtained was freed of benzene by vacuum distillation at kettle temperature of 125° C. and 3 to 4 mm. absolute pressure. The molten product thus obtained was poured into a mold, and when solid, was flaked. The flaked hydrolyzed product had a viscosity of 613 centistokes at 210° F. Its stability on storage appears in Table I, in which the present product is cited as sample E.

EXAMPLE II

By means of a procedure identical with that of Example I, a hydrolyzed polyethylene glycol was prepared from a mixture of 1000 grams of polyethylene glycol having a viscosity of 814 centistokes at 210° F., 800 ml. of water and 200 ml. of 0.5 N. sulfuric acid. After removing 200 ml. of distillate, 200 ml. of 0.5 N. sodium hydroxide were introduced. The steps of dehydration, filtration and product preparation were repeated as above described under Example I. The hydrolysis product had a viscosity of 596 centistokes at 210° F. This hydrolyzed polyethylene glycol was treated in a second hydrolysis procedure in an identical fashion as above. The product of this second hydrolysis had a viscosity of 608 centistokes at 210° F. Its stability upon storage appears in Table I, cited as sample D.

EXAMPLE III

A mixture of 1000 grams of polyethylene glycol having a viscosity of 852 centistokes at 210° F., 2000 grams of water and 250 ml. of a phenol-formaldehyde ion-exchange resin (acidic form) was added to a 4-liter beaker. The mixture was stirred vigorously for 30 minutes and suction filtered. The process was repeated twice using fresh portions of the ion-exchange resin. The resulting solution was treated twice in the same manner as above, using 250-ml. portions of the same resin in its basic form. The aqueous solution was dehydrated using benzene as indicated in Example I. The final hydrolysis product was prepared as finely divided particles by pouring the benzene solution slowly with vigorous agitation into an equal volume of heptane. After drying, this product had a viscosity of 627 centistokes at 210° F. This product was stable on storage as indicated in Table I in which it is cited as sample F.

EXAMPLE IV

In a 1-liter flask fitted with a thermometer well and a power stirrer were placed 700 grams of hydrolyzed polyethylene glycol (the product of Example I). Upon heating to 70° C. to 75° C., 20 grams of dibutyl acetal and 0.2 grams of benzene sulfonic acid were added. The resulting mixture was stirred vigorously and maintained at 70° C. to 80° C. for four hours. At the end of this time the stirrer was replaced by a goose-neck vapor line. The mixture then was heated gradually to 100° C. to 110° C. at 4 to 5 mm. absolute pressure. After cooling the reactants to below 80° C., 5 grams of sodium acetate and 500 ml. of dry benzene were added. The mixture was stirred vigorously for one to two hours and allowed to stand overnight. The mixture then was filtered, the solvent removed and a flaked product prepared as above described under Example I. The acetalized polyethylene glycol thus produced had a viscosity of 878 centistokes. Its extreme instability on storage is illustrated in Table I in which it appears cited as sample G.

Table I compares the change in viscosity of six samples of flaked solid polyethylene glycol. The three untreated samples labeled "A," "B" and "C" show a marked decrease in melt viscosity. Large increments of change occur monthly, especially in the case of the two higher viscosity samples "A" and "B." By contrast, samples "D," "E" and "G," which were treated according to the instant method, maintain their initial viscosity and, but for possible experimental error, appear to increase in viscosity.

Example IV above shows conclusively the adverse effect of polyethylene glycol acetals upon polyethylene glycols during storage. As indicated previously, the de-acetalized sample of polyethylene glycol obtained in Example I was divided into two portions. One of these was subjected to an acetalizing reaction by an alcohol exchange reaction, which reaction is known to give polyethylene glycol acetals. The product obtained appears labeled as sample G in Table I. The second portion of the sample was retained for control reference, and appears as sample E in Table I. Melt viscosities were determined for each. As indicated in Table I, the melt viscosity of the reference portion of the sample has decreased as the result of hydrolysis. The melt viscosity of the reacted portion in which acetal bonds were reintroduced increased. Furthermore, upon storage, the hydrolyzed compound showed stability, while the acetalized compound clearly showed instability inasmuch as a continuous decrease in its melt viscosity pointed to a typical deterioration.

*Table I*

STABILITY OF FLAKED SOLID POLYETHYLENE GLYCOL DURING STORAGE IN CLOSED CONTAINERS AT AMBIENT TEMPERATURES

| Classification | Untreated | | |
|---|---|---|---|
| Sample | A | B | C |
| Storage Time, Months | Melt Viscosity, cks. at 210° F. | Melt Viscosity, cks. at 210° F. | Melt Viscosity, cks. at 210° F. |
| 0 | 787 | 796 | 626 |
| 1 | 670 | 667 |  |
| 2 | 552 | 614 |  |
| 3 | 489 | 532 | 664 |
| 4 | 371 | 427 |  |
| 5 | 261 | 322 | 558 |
| 12 |  |  |  |
| 16 | 77 |  |  |

| Classification | Deacetalized | | | Reacetalized |
|---|---|---|---|---|
| Sample | D | E | F | G* |
| Storage Time, Months | Melt Viscosity, cks. at 210° F. | Melt Viscosity, cks. at 210° F. | Melt Viscosity, cks. at 210° F. | Melt Viscosity, cks. at 210° F. |
| 0 | 608 | 613 | 627 | 878 |
| 1 |  |  | 646 |  |
| 2 | 626 | 671 |  | 603 |
| 3 | 628 | 656 | 646 |  |
| 4 | 637 | 654 | 646 |  |
| 5 |  |  | 636 | 454 |
| 6 |  |  |  | 342 |

*Prepared from polyethylene glycol Sample E.

Typical analytic data showing efficiency of the invention appear in Table II.

*Table II*

HYDROLYSIS OF POLYETHYLENE GLYCOL ACETALS REMOVAL OF ACETALDEHYDE

Untreated polyethylene glycol, viscosity, centistokes at 210° F. _____ 766

First hydrolysis:

Acetaldehyde removed as grams acetaldehyde per 1000 grams of untreated polyethylene glycol _____ 0.142

Hydrolyzed polyethylene glycol, viscosity, centistokes at 210° F. _____ 672

Second hydrolysis:

Acetaldehyde removed as grams acetaldehyde per 1000 grams of hydrolyzed polyethylene glycol _____ 0.012

Rehydrolyzed polyethylene glycol, viscosity, centistokes at 210° F. _____ 686

For the purposes of this table, a sample of polyethylene glycol having a starting acetal content equivalent to 0.015 percent acetaldehyde was treated twice by the method of the invention. As is obvious from Table II, the second treatment removed the last traces of acetal. A significant decrease in the melt viscosity of the sample is to be noted after the first treatment. Allowing for experimental error, the second treatment resulted in no substantial change.

It has been shown conclusively, therefore, that the instant process prevents typical polyethylene glycol and polyglycol compound degradation without the addition of any adulterants either in the form of oxidation inhibitors or stabilizers. Accordingly, polyethylene glycol compounds stabilized by the process of the present invention are particularly attractive for use in formulating cosmetics, pharmaceutical agents, and in general wherever the use of prior art additives interferes with the employment of polyoxyalkylene glycol compounds in such applications.

While this invention has been described with particular reference to polyethylene glycol, its method is applicable generally to all mono- and polyglycol compounds which contain acetal impurities.

What is claimed is:

1. A method of stabilizing polyethylene glycol compounds containing acetal impurities, which method consists of treating said compounds to hydrolyze the acetal impurities contained therein, and subsequently removing the resultant product.

2. A method of stabilizing polyethylene glycol containing acetal, which method comprises hydrolyzing said acetal and removing the resultant acetaldehyde.

3. A method of stabilizing polyethylene glycol compounds containing acetal impurities, which method consists of heating a mixture of the glycol, water, and an acid catalyst; neutralizing said mixture; dehydrating the same, and collecting the resultant acetal-free polyglycol compound.

4. A method of stabilizing polyethylene glycol having acetal impurities, which method consists of heating a mixture of the glycol, water, and an acid catalyst; neutralizing said mixture; dehydrating the same, and collecting the resultant acetal-free polyethylene glycol.

5. The process of removing acetal impurities from polyethylene glycol compounds, which method consists of forming a mixture of said compounds with water and dilute sulfuric acid; heating said mixture to boiling; cooling the same; neutralizing the mixture; adding benzene thereto to remove water; refluxing; cooling; filtering the reactants, and separating the resultant acetal-free product from the filtrate.

References Cited in the file of this patent

UNITED STATES PATENTS

| 2,380,524 | Hillyer | July 31, 1945 |
| 2,485,329 | Steel et al. | Oct. 18, 1949 |
| 2,492,955 | Ballard et al. | Jan. 3, 1950 |
| 2,520,733 | Morris et al. | Aug. 29, 1950 |